United States Patent
Yang et al.

(10) Patent No.: US 9,590,542 B2
(45) Date of Patent: Mar. 7, 2017

(54) BRUSHLESS MOTOR AND CONTROL METHOD THEREOF

(71) Applicant: CHERVON INTELLECTUAL PROPERTY LIMITED, Road Town (VG)

(72) Inventors: Dezhong Yang, Nanjing (CN); Pingbo Shi, Nanjing (CN)

(73) Assignee: Chervon Intellectual Property Limited (VG)

( * ) Notice: Subject to any disclaimer, the term of this patent is extended or adjusted under 35 U.S.C. 154(b) by 71 days.

(21) Appl. No.: 14/568,278

(22) Filed: Dec. 12, 2014

(65) Prior Publication Data

US 2015/0188464 A1 Jul. 2, 2015

(30) Foreign Application Priority Data

Dec. 26, 2013 (CN) .......................... 2013 1 0732440

(51) Int. Cl.
*H02P 6/04* (2016.01)
*H02P 6/18* (2016.01)

(52) U.S. Cl.
CPC .................................... *H02P 6/181* (2013.01)

(58) Field of Classification Search
CPC .......... H02P 6/22; H02P 2101/45; H02P 6/10; H02P 9/30; H02P 2203/01; H02P 6/20; B60P 3/12; B65G 2203/042; B65G 39/02; B65G 43/08; B65G 43/10; B65G 47/261; B66D 1/12; B66D 1/46; B66D 1/58
USPC ..................... 318/254.2, 400.02, 400.11, 727
See application file for complete search history.

(56) References Cited

U.S. PATENT DOCUMENTS

| | | | | |
|---|---|---|---|---|
| 6,340,873 B2* | 1/2002 | Seki | ..................... | 318/400.11 |
| 6,344,721 B2* | 2/2002 | Seki | ..................... | 318/400.11 |
| 6,563,286 B2* | 5/2003 | Seki | ..................... | H02P 6/22 |
| | | | | 318/431 |
| 6,864,650 B2* | 3/2005 | Heravi | ................. | B60P 3/12 |
| | | | | 318/266 |
| 7,187,151 B2* | 3/2007 | Itoh | ..................... | B65G 39/02 |
| | | | | 318/474 |
| 7,253,574 B2* | 8/2007 | Su | ....................... | H02P 6/10 |
| | | | | 318/254.2 |

(Continued)

*Primary Examiner* — Paul Ip
(74) *Attorney, Agent, or Firm* — Greenberg Traurig, LLP

(57) ABSTRACT

A brushless motor includes a rotor, a plurality of sets of stator windings, a position detection assembly, a MOSFET assembly, an inductance detection module and a main control module that controls them. The position detection assembly has a plurality of detection elements for detecting a position of the rotor and a position detection module for receiving signals fed back from the detection elements with the position detection module being electrically connected to the main control module and feeding back the positional information of the rotor thereto. The main control module alternatively switches between the position detection assembly and the inductance detection module to detect the position of the rotor. When the motor runs at a low speed, the system may effectively judge the position of the rotor to enable the machine to start with a load and, when the motor runs at a high speed, the system may accurately judge the position of the rotor, correctly drive the motor to run, eliminate errors caused by assembly, and prolong the service life of the motor.

12 Claims, 1 Drawing Sheet

(56) References Cited

U.S. PATENT DOCUMENTS

| | | | | |
|---|---|---|---|---|
| 7,541,758 B2* | 6/2009 | Inaba | H02M 7/219 318/140 |
| 8,884,675 B2* | 11/2014 | Hernandez-Distancia | H03K 6/04 327/108 |
| 2001/0045812 A1* | 11/2001 | Seki | H02P 6/22 318/727 |
| 2001/0050542 A1* | 12/2001 | Seki | H02P 6/22 318/727 |
| 2002/0079860 A1* | 6/2002 | Seki | H02P 6/22 318/727 |
| 2004/0004455 A1* | 1/2004 | Fujimoto | H02P 6/20 318/474 |
| 2004/0263100 A1* | 12/2004 | Heravi | B60P 3/12 318/280 |
| 2006/0132077 A1* | 6/2006 | Itoh | B65G 39/02 318/400.02 |
| 2006/0158162 A1* | 7/2006 | Inaba | H02M 7/219 323/237 |
| 2007/0001633 A1* | 1/2007 | Su | H02P 6/10 318/822 |
| 2010/0052449 A1* | 3/2010 | Hashimoto | B62D 5/0406 310/91 |

* cited by examiner

BRUSHLESS MOTOR AND CONTROL METHOD THEREOF

RELATED APPLICATION INFORMATION

This application claims the benefit of CN 201310732440.1, filed on Dec. 26, 2013, the disclosure of which is incorporated herein by reference in its entirety.

FIELD OF THE DISCLOSURE

The subject disclosure relates to a brushless motor and a control method thereof, and specifically to a brushless motor having two detection modes and a control method thereof.

BACKGROUND

The key to controlling a DC brushless motor lies in that a rotor position is detected, then a phase change point is obtained according to a position information, a corresponding stator winding is energized for phase change, and an energizing current is synchronous with a counter electromotive force phase of the winding. An electric tool needs to be started with a full torque on a majority of application occasions. The full-torque start may be achieved upon control with a sensor, but a mounting error exists and substantially affects direction change and reduces an efficiency of the whole machine particularly when a motor with a larger number of pole-pairs is running at a high speed.

SUMMARY

To solve the drawbacks in the prior art, the following describes a brushless motor and a control method thereof which can achieve full-torque start and meanwhile accurately achieve the direction change of the current of the stator windings in a high-speed state.

More particularly, the following describes a brushless motor, comprising: a rotor, a plurality of sets of stator windings, a position detection assembly, a MOSFET assembly, an inductance detection module and a main control module for controlling them; wherein the position detection assembly comprises a plurality of detection elements for detecting a position of the rotor and a position detection module for receiving signals fed back from the detection elements, and the position detection module being electrically connected to the main control module and feeding back the position information of the rotor thereto; wherein the MOSFET assembly comprises a MOSFET module for controlling the stator windings to achieve a current switch, and a MOSFET drive module for driving the MOSFET module, wherein the MOSFET module is electrically connected to the stator windings, and the MOSFET drive module is electrically connected to the main control module and the MOSFET module respectively; wherein the inductance detection module is electrically connected to the stator windings respectively and detects the current of the stator windings; and wherein the main control module alternatively switches between the position detection assembly and the inductance detection module to detect the position of the rotor; and when a rotational speed of the rotor is smaller than a switch rotational speed, the main control module controls the position detection assembly to detect the position of the rotor and controls the current switch of the stator windings according to the feedback of the position detection module, and when the rotation speed of the rotor is greater than or equal to the switch rotation speed, the main control module switches to the inductance detection module to detect the position of the rotor and controls the current switch of the stator windings according to the feedback of the inductance detection module.

Furthermore, the position detection elements may be Hall elements.

Furthermore, both the number of the stator windings and the number of the detection elements may be three.

Furthermore, a rated rotation speed of the rotor is N, and the switch rotation speed of the rotor may be in a range of 0.1N to 0.2N.

Furthermore, the main control module may set a return difference interval for the switch rotation speed such that, when the rotation speed of the rotor approaches to the switch rotation speed, the return difference interval control is employed.

Furthermore, a length of a unidirectional interval of the return difference interval may be in a range less than 0.1N.

Also described is a brushless motor control method for use with a brushless motor comprising: a rotor, a plurality of sets of stator windings, a position detection assembly, a MOSFET assembly, an inductance detection module and a main control module for controlling them; wherein the position detection assembly comprises a plurality of detection elements for detecting a position of the rotor and a position detection module for receiving signals fed back from the detection elements, and the position detection module being electrically connected to the main control module and feeding back the position information of the rotor thereto; wherein the MOSFET assembly comprises a MOSFET module for controlling the stator windings to achieve current switch, and a MOSFET drive module for driving the MOSFET module, wherein the MOSFET module is electrically connected to the stator windings, and the MOSFET drive module is electrically connected to the main control module and the MOSFET module respectively; and wherein the inductance detection module is electrically connected to the stator windings respectively and detects the current of the stator windings.

In the described control method, the main control module alternatively switches between the position detection assembly and the inductance detection module to detect the position of the rotor; wherein when a rotation speed of the rotor is smaller than a switch rotation speed, the main control module controls the position detection assembly to detect the position of the rotor and controls the current switch of the stator windings according to the feedback of the position detection module; and when the rotation speed of the rotor is greater than or equal to the switch rotation speed, the main control module switches to the inductance detection module to detect the position of the rotor and controls the current switch of the stator windings according to the feedback of the inductance detection module; upon start, the main control module first controlling the position detection assembly to detect the position of the rotor and then controlling the current switch of the stator windings according to the feedback of the position detection module.

Furthermore, the position detection elements may be Hall elements.

Furthermore, both the number of the stator windings and the number of the detection elements may be three.

Furthermore, a rated rotation speed of the rotor is N, and the switch rotation speed of the rotor may be in a range of 0.1N to 0.2N.

Furthermore, the main control module may set a return difference interval for the switch rotation speed such that, when the rotation speed of the rotor approaches to the switch rotation speed, the return difference interval control is employed.

Furthermore, a length of a unidirectional interval of the return difference interval may be in a range less than 0.1N.

Advantageous effects of the present invention are as follows: when the motor runs at a low speed, the present invention may effectively judge the position of the rotor to enable the machine to start with a load; and when the motor runs at a high speed, the present invention may accurately judge the position of the rotor, correctly drives the motor to run, eliminates errors caused by the assembling, and prolongs the service life of the motor.

DETAILED DESCRIPTION

An exemplary motor and method thereof will be introduced in detail with reference to the figures and specific embodiments.

Figure 1:
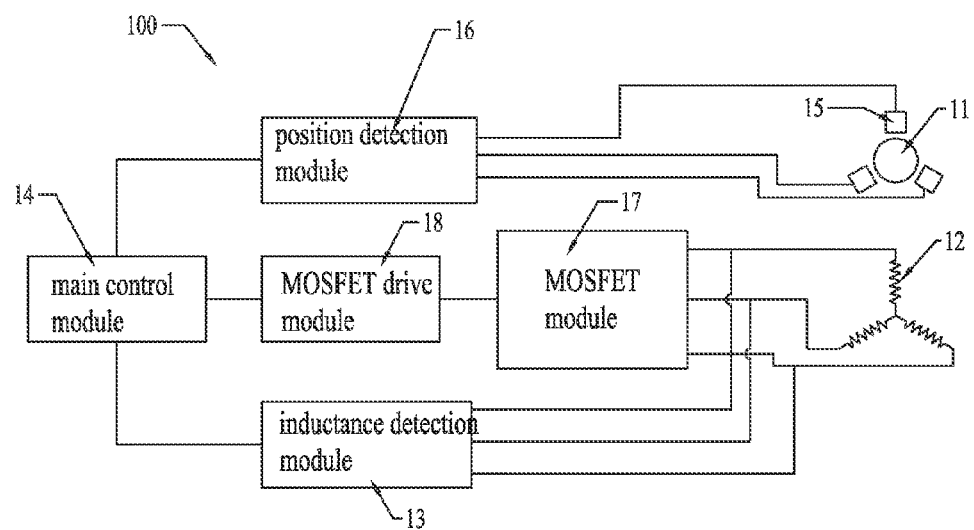
FIG. 1 is a structural block diagram of an exemplary brushless motor constructed according to the description which follows.

Referring to FIG. 1, an exemplary brushless motor 100 comprises: a rotor 11, three sets of stator windings 12, a position detection assembly, a MOSFET assembly; an inductance detection module 13 and a main control module 14 that controls them.

The position detection assembly comprises three detection elements 15 for detecting a position of the rotor, and a position detection module 16 for receiving signals fed back from the detection elements, wherein the position detection module 16 is electrically connected to the main control module 14 and feeds back the position information of the rotor 11 thereto.

The inductance detection module 13 is electrically connected to the stator windings 12 respectively and detects the current of the stator windings 12.

As a preferred solution, the position detection elements 15 are Hall elements and disposed at different rotation positions of the rotor 11 to achieve detection of the position and speed of the rotor 11.

The MOSFET assembly comprises a MOSFET module 17 for controlling the stator windings 12 to achieve a current switch, and a MOSFET drive module 18 for driving the MOSFET module 17, wherein the MOSFET module 17 forms electrical connection to all the stator windings 12 to achieve the drive.

The MOSFET drive module 18 is electrically connected to the main control module 14 and the MOSFET module 17 respectively. The main control module 14 may control a direction and magnitude of the current supplied to each stator winding via the MOSFET module 17 and the MOSFET drive module 18 so that a rotatable magnetic field may be formed around the rotor 11 by the stator windings 12 so as to drive the rotor 11 to rotate. Such control is achieved based on the detection of the position of the rotor 11. However, when the position detection element 15 is assembled, a certain error inevitably occurs, so when the rotor 11 rotates at a high speed, the data fed back by the position detection module 16 to the main control module 14 is inaccurate, which affects the operation.

As known from electricity principles, when the rotor 11 rotates at a speed, it imposes division of the magnetic field formed by the stator windings 12 so that a counter electromotive force is formed in the stator windings 12. The counter electromotive force exerts an influence on the inductance of the stator windings 12 and causes the current therein to change. The current is in correspondence relationship with the inductance, and the inductance of the stator windings 12 has a definite correspondence relationship with the position of the rotor 11. Therefore, the current of all stator windings 12 may be detected comprehensively so as to determine the position of the rotor 11. However, the counter electromotive force of the rotor 11 upon start is zero. Apparently, it is impossible to achieve smooth full-torque start when the inductance detection module 13 is used to detect position start.

Therefore, a control method according to the present invention employs the following solution.

The main control module 14 alternatively switches between the position detection assembly and the inductance detection module 13 to detect the position of the rotor 11. When a rotation speed of the rotor 11 is smaller than a switch rotation speed, the main control module 14 controls the position detection assembly to detect the position of the rotor 11 and controls the current switch of the stator windings 12 according to the feedback of the position detection module 16. When the rotation speed of the rotor 11 is greater than or equal to the switch rotation speed, the main control module 14 switches to the inductance detection module 13 to detect the position of the rotor and controls the current switch of the stator windings 12 according to the feedback of the inductance detection module 13.

To achieve a smooth full-torque start, upon start, the main control module 14 controls the position detection assembly to perform position detection for the rotor 11 and controls the current switch of the stator windings 12 according to the feedback of the position detection module 16.

As such, in a low-speed stage, the position detection module 16 provides data to achieve a start, and after a transition time period, detection is achieved depending on the more accurate inductance detection module 13 in a progressively high-speed stage to improve the accuracy of the direction change.

As a preferred solution, a rated rotational speed of the motor 11 of the brushless motor 100 is N, and the switch rotational speed of the rotor is in a range of 0.1N to 0.2N.

As a more specific preferred solution, the switch rotation speed is 15% of the rated rotation speed, namely, 0.15N.

Figure 2:
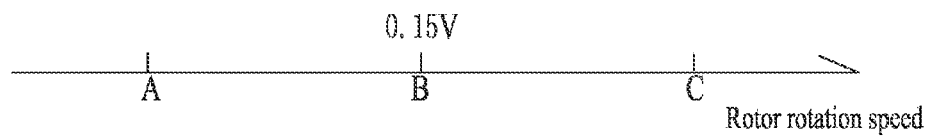
FIG. 2 is a schematic view of a return difference interval according to the description which follows.

Referring to FIG. 2, more preferably, the main control module 14 sets a return difference interval AC for the switch rotational speed. When the rotational speed of the rotor 11 approaches the switch rotational speed B, the return difference interval control is employed. A length of a unidirectional interval AB or BC of the return difference interval AC is in a range less than 0.1N, wherein the length of the unidirectional interval refers to a length of an interval expanding from the switch rotation speed B as a boundary towards the left side or the right side thereof, namely, a length of a negative return difference interval AB or a positive return difference interval BC, as shown in FIG. 2. It means that the return difference interval is in a certain interval range greater than or smaller than the switch speed B. It should be noted that the negative return difference interval AB or the positive return difference interval BC may take a different value.

The purpose of setting the return difference interval AC is to prevent the main control module 14 from repeatedly and frequently switching the detection mode at the switch speed to achieve a smooth switch between the two kinds of detection modes. The specific method goes as follows: when the rotational speed of the rotor 11 enters the return difference interval, it starts to judge whether the rotational speed of the rotor 11 reaches the switch rotational speed B and has already gone beyond the scope of the return difference interval AC; and the switching will be achieved if yes, or the original detection mode is maintained if no.

The above illustrates and describes basic principles, main features and advantages of the present invention. Those skilled in the art should appreciate that the above embodiments do not limit the present invention in any form. The technical solutions obtained by equivalent substitution or equivalent variations all fall within the protection scope of the present invention.

What is claimed is:

1. A brushless motor, comprising:
    a rotor and a plurality of sets of stator windings operable coupled with the rotor such that the rotor and the plurality of sets of stator windings are rotatable relative to one another;
    a position detection assembly coupled to at least one of the rotor or the plurality sets of stator windings to detect the relative position between the rotor and the plurality sets of stator windings;
    a MOSFET assembly operable coupled to the plurality of sets of stator windings;
    an inductance detection module operable coupled to the plurality of sets of stator windings; and
    a main control module operably coupled to the position detection assembly, the MOSFET assembly and the inductance detection module for controlling the position detection assembly, the MOSFET assembly, and the inductance detection module;
    wherein the position detection assembly comprises a plurality of detection elements for detecting a position of the rotor and a position detection module for receiving signals fed back from the detection elements and the position detection module is electrically connected to the main control module and feeds back the position information of the rotor thereto;
    wherein the MOSFET assembly comprises a MOSFET module for controlling the stator windings to achieve a current switch, and a MOSFET drive module for driving the MOSFET module, the MOSFET module is electrically connected to the stator windings, and the MOSFET drive module is electrically connected to the main control module and the MOSFET module respectively;
    wherein the inductance detection module is electrically connected to the stator windings and detects the current of the stator windings; and
    wherein the main control module alternatively switches between the position detection assembly and the inductance detection module to detect the position of the rotor and, when a rotational speed of the rotor is smaller than a switch rotational speed, the main control module controls the position detection assembly to detect the position of the rotor and to control the current switch of the stator windings according to the feedback of the position detection module and, when the rotational speed of the rotor is greater than or equal to the switch rotational speed, the main control module switches to the inductance detection module to detect the position of the rotor and to control the current switch of the stator windings according to the feedback of the inductance detection module.

2. The brushless motor according to claim 1, wherein the position detection elements are Hall elements.

3. The brushless motor according to claim 1, wherein both the number of the stator windings and the number of the detection elements are three.

4. The brushless motor according to claim 1, wherein a rated rotation speed of the rotor is N, and the switch rotation speed of the rotor is in a range of 0.1N to 0.2N.

5. The brushless motor according to claim 1, wherein the main control module sets a return difference interval for the switch rotational speed, and the return difference interval control is employed when the rotational speed of the rotor approaches to the switch rotational speed.

6. The brushless motor according to claim 1, wherein a length of a unidirectional interval of the return difference interval is in a range less than 0.1N.

7. A brushless motor control method for use with a brushless motor comprised of a rotor and a plurality of sets of stator windings rotatably coupled to the rotor, a position detection assembly coupled to at least one of the rotor or the plurality of sets of stator winding to detect the relative position between the rotor and the plurality of sets of stator windings, a MOSFET assembly coupled to the plurality of sets of stator windings, an inductance detection module coupled to the plurality of sets of stator windings and a main control module operably coupled to the position detection assembly, the MOSFET assembly and the inductance detection module for controlling the position detection assembly, the MOSFET assembly and the inductance detection module, wherein the position detection assembly comprises a plurality of detection elements for detecting a position of the rotor and a position detection module for receiving signals fed back from the detection elements with the position detection module being electrically connected to the main control module and feeds back the position information of the rotor thereto, wherein the MOSFET assembly comprises a MOSFET module for controlling the stator windings to achieve current switch and a MOSFET drive module for driving the MOSFET module with the MOSFET module being electrically connected to the stator windings and with the MOSFET drive module being electrically connected to the main control module and the MOSFET module respectively, and wherein the inductance detection module is electrically connected to the stator windings respectively and detects the current of the stator windings, the method comprising:
    causing the main control module to alternatively switch between the position detection assembly and the inductance detection module to detect the position of the rotor according to the following in which, when a rotational speed of the rotor is smaller than a switch rotational speed, the main control module controls the position detection assembly to detect the position of the rotor and controls the current switch of the stator windings according to the feedback of the position detection module and, when the rotation speed of the rotor is greater than or equal to the switch rotation speed, the main control module switches to the inductance detection module to detect the position of the rotor and controls the current switch of the stator windings according to the feedback of the inductance detection module and, upon starting of the motor, the main control module first controls the position detection assembly to detect the position of the rotor and then controls the current switch of the stator windings according to the feedback of the position detection module.

8. The brushless motor control method according to claim 7, wherein the position detection elements are Hall elements.

9. The brushless motor control method according to claim 7, wherein both the number of the stator windings and the number of the detection elements are three.

10. The brushless motor control method according to claim 7, wherein a rated rotational speed of the rotor is N, and the switch rotational speed of the rotor is in a range of 0.1N to 0.2N.

11. The brushless motor control method according to claim 7, wherein the main control module sets a return difference interval for the switch rotational speed, and the return difference interval control is employed when the rotational speed of the rotor approaches to the switch rotation speed.

12. The brushless motor control method according to claim 11, wherein a length of a unidirectional interval of the return difference interval is in a range less than 0.1N.

* * * * *